April 29, 1947. F. A. DODELIN ET AL 2,419,826
EXPLOSIVELY OPERATED SHEARING DEVICE FOR FRANGIBLE
CLOSURE DISCS OF PRESSURE FLUID CONTAINERS
Filed Nov. 7, 1944 2 Sheets-Sheet 1
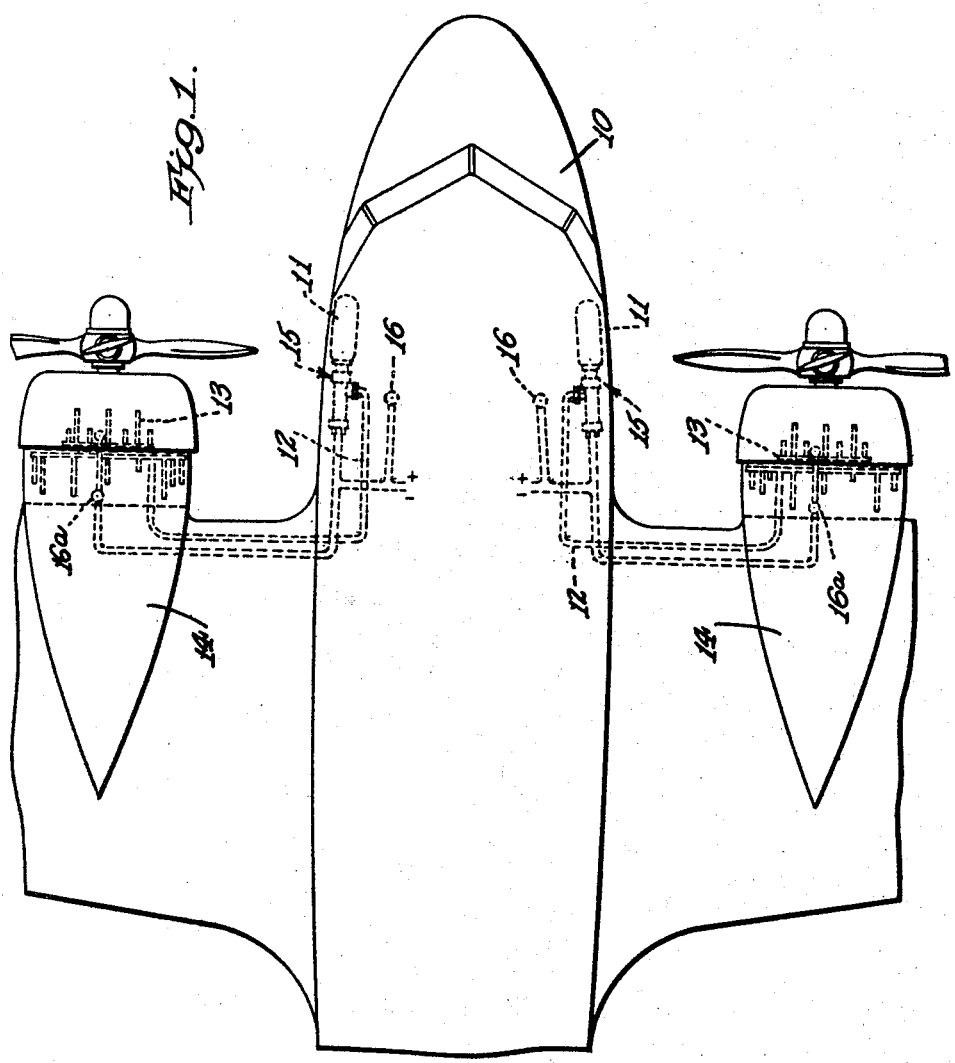
INVENTORS
FREDERICK A. DODELIN
PETER GRAHAM MAC GREGOR
BY
ATTORNEY

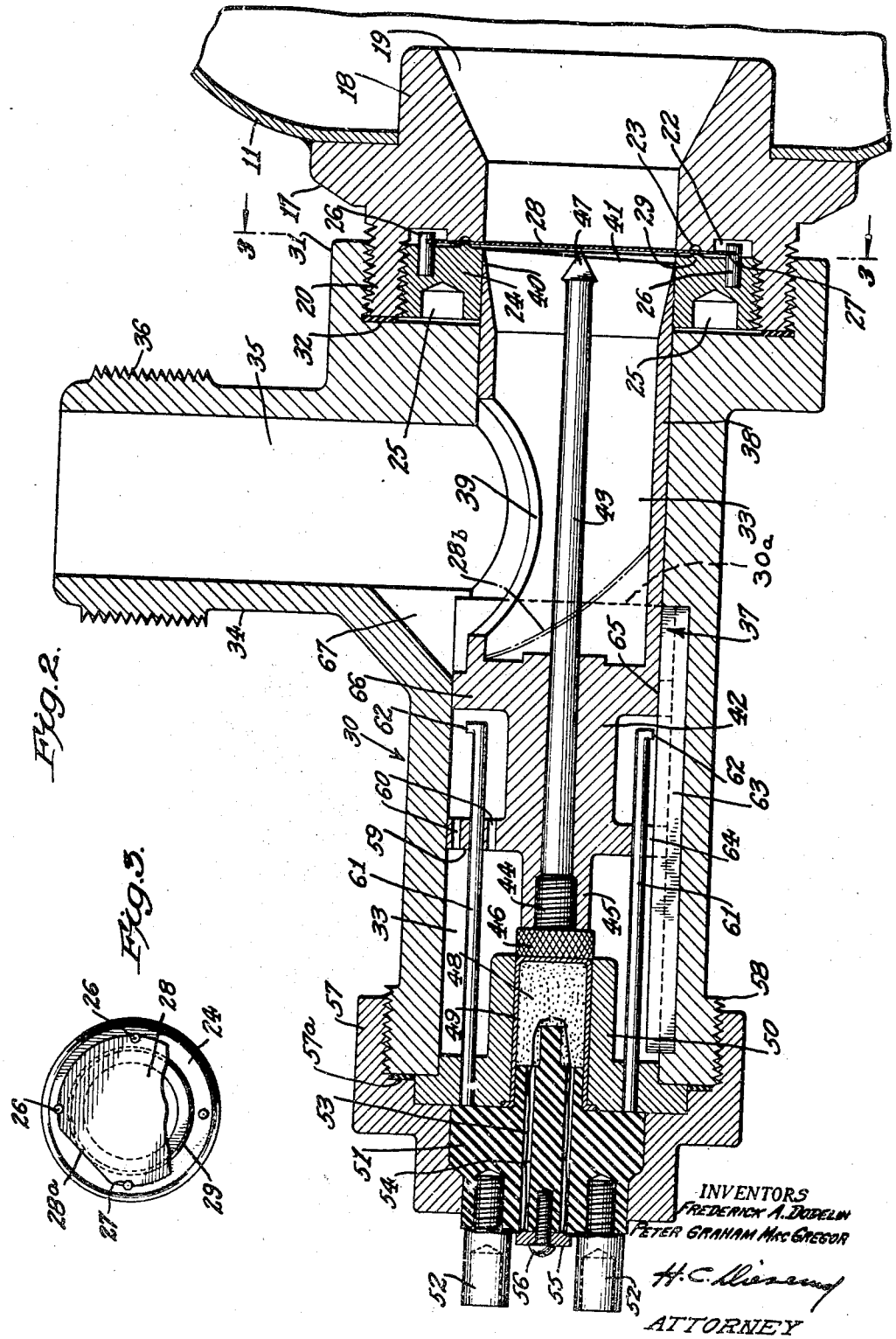

Patented Apr. 29, 1947

2,419,826

UNITED STATES PATENT OFFICE 2,419,826

EXPLOSIVELY OPERATED SHEARING DEVICE FOR FRANGIBLE CLOSURE DISCS OF PRESSURE FLUID CONTAINERS

Frederick A. Dodelin, Glen Ridge, and Peter Graham MacGregor, Pequannock, N. J., assignors to Pyrene Manufacturing Company, Newark, N. J., a corporation of Delaware Application November 7, 1944, Serial No. 562,300

3 Claims. (Cl. 222—5)

This invention relates to a head associated with a closure for a tank or other container adapted to retain a gas or liquid under high pressure for indefinite periods. A particular application of the invention involves its use in association with a closure serving to control the discharge of a fire extinguishing fluid in a system applied to an aeroplane, as disclosed in the patent to MacGregor, No. 2,340,006, granted January 25, 1944.

One object of the invention has been to provide a simple but effective means, which may be readily renewed or replaced, for sealing a tank or other vessel more or less permanently against the escape of gas or liquid under high pressure.

Another object has been to provide sealing means of the character indicated which includes a frangible or readily shearable disc or other closure member adapted to be broken or punctured or sheared to permit the discharge of the contents of the tank when desired. This disc or closure member is so constructed and mounted as to enable its ready replacement, after use, and the production of a new and effective seal to permit refilling of the tank.

A further object of the invention has been to provide a reliable means for shearing, rupturing, or otherwise providing an opening through the sealing disc or member and thereby enabling the free discharge of the tank contents.

As a specific feature in connection with the foregoing object, explosive means or similar power means are provided for propelling a shearing member which operates to form a relatively large opening through the sealing disc. The construction and arrangement are such, moreover, that the shearing member and the sheared portion of the disc are moved to a position, following the shearing operation, in which they will not interfere with the free discharge of the contents of the tank. Special provisions are made to insure this.

Other objects, features, and advantages of the invention will appear from the detailed description of an illustrative form of the invention which will now be given in conjunction with the accompanying drawings, in which:

Figure 1 is a top plan view of a portion of an aeroplane structure showing one application of the invention;

Figure 2 is a longitudinal sectional view through a tank closure constructed in accordance with the invention; and Figure 3 is a transverse sectional view, taken along the line 3—3 of Figure 2, on a reduced scale.

Referring now to Figure 1, a portion of the fuselage and wing structure of an aeroplane is shown and designated generally as 10. Within the fuselage there is mounted one or more (2 being shown) tanks or containers 11 adapted to retain a suitable fire extinguishing fluid, such as methyl bromide, carbon tetrachloride, carbon dioxide, or the like. Suitable pipes or tubing 12 serve to deliver the fire extinguishing fluid to appropriate distributing nozzles within the cowls 13 of the engines 14 mounted in the wing structure. The system for distributing the fire extinguishing fluid may suitably be of the type disclosed in the above mentioned MacGregor patent. The supply of the fluid from the container 11 to the tubing 12 may be controlled by a unit 15, the details of which are illustrated in Figures 2 and 3 and constitute the main part of the present invention. The arrangement is such that the closure may be opened to permit the discharge of the fire extinguishing fluid either under manual control, as by operation of a switch or push button 16, accessible to the pilot of the plane, or under automatic thermostatic control, as by the employment of a temperature responsive member 16a within the housing of the engine. It will be understood that the control, whether manually or automatically effected, will be through suitable electrical connections from the elements 16 and 16a adapted to close a circuit from a suitable source of electricity available on the plane.

Turning now to Figure 2, the tank 11 is shown as provided at one end with a fitting 17 having a portion 18 extending through a suitable aperture in the wall of the tank, this fitting being secured to the tank in any suitable way as by welding or the like. Fitting 17 is provided with a discharge passage through its center of appropriate size to permit the fire extinguishing fluid to be delivered to the point of use within the brief time interval permitted for this purpose. The inner end of the passage through the fitting is preferably flared as indicated at 19. The outer end 20 of the fitting 17 is screw threaded both internally and externally. At the base of the threaded portion 20 there is provided a transversely extending shoulder having a relatively deep and wide annular recess 22 formed adjacent its outer edge at the base of the threaded part 20. Between the central passage through the fitting 17 and the annular channel 22, there is provided an annular depression 23, preferably semi-circular in cross-section as indicated in Figure 2.

An annular member 24 having an internal opening of the same size as the cylindrical portion of the central passage through the fitting 17 is provided with external screw threads adapted to cooperate with the internal threads on the portion 20. Spanner wrench openings 25 are provided in the outer surface of the member 24 to permit it to be screwed into place within the fitting 17. A series of pins 26, preferably four in number, is mounted in the opposite face of the member 24, these pins projecting a slight distance from said opposite face but less than the depth of the groove 22 into which they project. Pins 26 are grooved, as indicated at 27, on their inner faces to receive the edge of a sealing disc 28 formed of any suitable material such as copper or other appropriate metal, or a suitable plastic. The grooves 27 may suitably extend half way through the pins 26 and they are so disposed as to face radially inwardly toward the axis of the member 24. One face or wall of the groove in each pin is preferably substantially flush with the outer face of the member 24, while the opposite face of each groove is spaced sufficiently from the face of member 24 to permit the ready insertion of a sealing disc of appropriate thickness. Disc 28 is preferably provided with a flat side or straight edge portion 28a of sufficient length to enable the disc to be readily inserted in the grooves 27 of three of the pins with the flat side opposite the fourth pin, the disc then being readily rotated to position the flat side intermediate two pins. The disc is then quite firmly held by the grooves in all four of the pins. Intermediate the central opening through the member 24 and the circle formed by the series of pins 26, the inner face of the member 24 is provided with an annular bead or rib 29 adapted to cooperate with the recess 23 in the fitting 17. The arrangement is such that when the member 24 is scrwed tightly into place in the fitting the rib 29 will squeeze a portion of the sealing disc into the depression 23 and thus form an effective seal which remains effective for relatively long periods of time. The relation between the sealing disc and the slots in the pins is such that when the disc is gripped between the rib 29 and groove 23 the member 24 may be rotated relative to the disc.

For the purpose of breaking the seal, when desired, and controlling the discharge of the contents of the tank, a disc shearing unit is provided, this unit comprising an outer casing or housing 30. At its inner end the housing 30 is provided with an annular, axially extending flange 31 which is screw threaded to cooperate with the external threads on the portion 20 fitting 17. A washer or gasket 32, formed of copper or any other suitable material, may be provided within the base of the housing 30 to cooperate with the end of the portion 20 and form a tight seal therewith. The interior of the housing 30 provides a chamber or bore 33 which is alined axially with the passage through the fitting 17 and member 24. At one side of the housing 30 a branch outlet extension 34 is provided, this having a discharge passage 35 which at its inner end communicates with the chamber or bore 33. Extension 34 is preferably screw threaded adjacent its outer end to receive a coupling member 36 associated with a hose or pipe line.

Within the bore or chamber 33 of the housing there is slidably mounted a piston member designated generally at 37. This member has a sleeve-like portion 38 the lower end of which fits snugly within the member 24 and is tapered on its inner surface, as indicated at 40, to provide a relatively sharp shearing edge 41 at its outer end. The shearing edge 41 is preferably in a plane inclined slightly to the axis of the unit so that the shearing action, upon movement of the piston member, will be progressive. The inclination of the edge 41 is preferably only a few degrees with respect to a plane transverse to the axis of the unit. Within the main body 42 of the piston member there is mounted, preferably axially of the member, a pin or spike 43 which may have a screw threaded portion 44 cooperating with internal threads in a neck 45 extending from the outer end of the piston member. An enlarged knurled head 46 may be provided at the outer end of the spike 43 to facilitate its rotation and adjustment within the piston member. At its inner end the spike is preferably provided with a relatively sharp pyramidal point 47, the tip of which is normally positioned adjacent the outer face of the sealing disc 28.

For propelling the piston member to effect shearing of the disc 28 by means of the edge 41, an explosive charge 48 may be employed. This is contained within a relatively thin metal shell 49 formed of brass or the like, fitting within the bore of a cap member 50, formed of brass or the like, carried at the outer end of the housing 30 and forming a partial closure for this outer end. A plug member 51 formed of insulating material, such as hard rubber or any suitable plastic, has a portion adapted to fit snugly within the outer end of the cartridge shell 49 and may suitably serve as the means for retaining this cartridge in the assembly of the structure. A pair of binding posts or contact elements 52 are mounted in the outer end of the plug 51, these binding posts being connected to the opposite ends of a filament 53 forming an electrical conductor extending into and through a portion of the powder charge 48. Filament 53 may suitably be a fine Nichrome wire. It is passed through slender openings 54 extending through the plug 51, these openings being preferably filled to prevent the escape of gases upon the explosion of the charge. Small slivers of wood may be employed for this purpose or, if desired, an appropriate plastic may be used. The filling material, however, is preferably of a type which may be readily removed to permit the insertion of a new filament after the charge has been set off. A small disc 55, retained by a screw 56, may be provided at the outer end of the plug 51 to close off the ends of the openings 54. It will be understood that binding posts 52 will be connected by suitable wires with the manual or automatic circuit closing devices 16 and 16a of Figure 1 and the source of electricity for the purpose of setting off the explosive charge whenever desired. A screw threaded cap 57 cooperating with threads 58 in the outer end of the housing 30 may serve to retain the closure member 50 and the plug 51 in assembled relationship to the housing. A washer or gasket 57a may be employed to effect a tight seal at the end of the housing.

A disc-like flange 59 is provided adjacent the outer end of the body portion 42 of the piston member, this flange being provided with a large number of small holes 60 for permitting the passage of the gases through the same. It is also provided with two larger holes adapted to receive and slide along a pair of guide pins 61 carried by the closure member 50. These guide pins have their inner ends 62 turned outwardly or otherwise enlarged to form a limit stop cooperating with the flange 59 to facilitate removal of the piston assembly for cleaning, inspection, etc. To prevent rotation of the piston member within the chamber a key 63 is provided in the wall of the main bore of the chamber, this key cooperating with slots 64 and 65 in the flange 59 and a shouldered portion 66 of the piston member.

In the use of the shearing unit when the explosive charge 48 is ignited through the passage of a current through the filament 53, the inner end of the shell 49 will be blown out or, if desired, suitable wadding may be used to close this end of the shell and this will then be blown out with the result that the piston member 42 will be rapidly driven toward the right in Figure 2 by the expanding gases to the extent permitted by the shoulder 30a of the housing 30. Movement of the piston member in this manner will cause the disc 28 to be sheared off by the action of the edge 41 cooperating with the leading edge of the central passage through the fitting 17. Simultaneously, or, if desired, slightly in advance of the shearing action, the spike 43 will have its point 47 driven through the center of the disc 28. The slope of the shearing edge 41 is preferably such as to shear the upper edge of the disc, as viewed in Figure 2, firstly, and then progerssively shear the disc around both sides toward the lower edge. This will result in the final positioning of the sheared portion of the disc as indicated at 28b in broken lines in Figure 2. It will be appreciated that as the disc is sheared off, the pressure of the fluid within the tank 11 will drive the disc outwardly along the spike 43 into the position 28b, indicated in broken lines. The pressure of the fluid will also serve to restore the piston member into the position shown in Figure 2 so that a free passage is provided for the fire extinguisher fluid through the interior of the sleeve-like portion 38 of the piston member and then outwardly through the opening 39 in the wall of this member and through the passage 35 in extension 34 to the tubing or pipe lines indicated. Positioning of the sheared portion of the disc, as shown at 28a, serves to assist in the free flow of the fluid in the manner indicated. Also, it should be noted that the flange 59 serves to prevent the jamming of the shattered end of the seal 49 or the wadding in the portion 67 of the valve housing, as might be the case in the absence of the flange 59. The shoulder portion 66 is carried into the region of the portion 67 of the housing upon the explosion of the charge so that a relief is provided for the gases produced by the explosion. However, the flange 59 is not carried far enough to permit the jamming of the seal or wadding and hence the free return of the piston member by the pressure of the fluid in the tank is permitted. Should the piston fail to return, however, the opening 39 is sufficiently large to permit the discharge of the fluid from the tank at a desired rate.

While an illustrative form of the invention has been described in detail, it should be understood that numerous changes may be made in the construction and arrangement of the various parts without departing from the general principles and scope of the invention. The manner of retaining and mounting the sealing disc 28, as herein disclosed, is being covered in a separate divisional application of Peter Graham MacGregor, Serial No. 696,535, filed on September 12, 1946.

What is claimed is:

1. A closure for an opening in a container adapted to retain a fluid under high pressure which comprises a shearable sealing disc, means for retaining said disc in fluidtight relation to said opening, a discharge member secured to said container, said member having an enclosed chamber alined with said opening and a laterally projecting outlet branch communicating with said chamber, a reciprocable shearing member mounted within said chamber adapted to shear a section from said sealing disc, said shearing member having a head forming a piston within said chamber, said head having a pocket intermediate its ends, explosive means adapted to generate gases for propelling said shearing member to effect said shearing action, and at least one passage in said head for delivering said gases to said pocket, said pocket communicating with said outlet branch when said shearing member is propelled by said gases.

2. A closure for an opening in a container adapted to retain a fluid under high pressure which comprises a shearable sealing disc, means for retaining said disc in fluidtight relation to said opening, a discharge member secured to said container, said member having an enclosed chamber alined with said opening and a laterally projecting outlet branch communicating with said chamber, a reciprocable shearing member mounted within said chamber adapted to shear a section from said sealing disc, said shearing member having a head with a main body portion forming a piston within said chamber, a laterally extending flange spaced from said main body portion and of substantially the same diameter as said portion, said flange and main body portion forming a circumferentially extending pocket therebetween, said flange having at least one passage therethrough for placing said pocket in communication with said chamber, and explosive means for generating gases within said chamber to propel said shearing member, said pocket being placed in communication with said outlet branch when said shearing member is so propelled.

3. A closure for an opening in a container adapted to retain a fluid under high pressure which comprises a shearable sealing disc, means for retaining said disc in fluidtight relation to said opening, a discharge member secured to said container, said member having an enclosed chamber alined with said opening and a laterally projecting outlet branch communicating with said chamber, a reciprocable shearing member mounted within said chamber adapted to shear a section from said sealing disc, said shearing member having a head with a main body portion forming a piston within said chamber, a laterally extending flange spaced from said main body portion and of substantially the same diameter as said portion, said flange and main body portion forming a circumferentially extending pocket therebetween, said flange having at least one passage therethrough for placing said pocket in communication with said chamber, explosive means for generating gases within said chamber to propel said shearing member, said pocket being placed in communication with said outlet branch when said shearing member is so propelled, and means cooperating with said flange for limiting the movement of said shearing member.

FREDERICK A. DODELIN.
PETER GRAHAM MacGREGOR.

REFERENCES CITED

The following references are of record in the file of this patent:

UNITED STATES PATENTS

| Number | Name | Date |
| --- | --- | --- |
| 2,203,626 | Grant | June 4, 1940 |
| 2,284,650 | Grant | June 2, 1942 |
| 1,845,082 | Fetterly | Feb. 16, 1932 |
| 1,622,831 | Kirkegaard | Mar. 29, 1927 |
| 1,933,694 | Allen et al. | Nov. 7, 1933 |
| 1,933,695 | Allen et al. | Mar. 5, 1935 |
| 2,206,818 | Mapes | July 2, 1940 |
| 2,350,451 | Emerey | June 6, 1944 |
| 1,772,454 | Bosworth | Aug. 12, 1930 |